(12) United States Patent
Muraki

(10) Patent No.: US 8,333,322 B2
(45) Date of Patent: Dec. 18, 2012

(54) PRODUCT IDENTIFICATION SYSTEM WITH COMPONENT CHARACTERISTICS

(75) Inventor: Yosuke Muraki, Campbell, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1497 days.

(21) Appl. No.: 11/693,922

(22) Filed: Mar. 30, 2007

(65) Prior Publication Data

US 2008/0237343 A1    Oct. 2, 2008

(51) Int. Cl.
*G06F 17/60* (2006.01)
(52) U.S. Cl. ......................... 235/385; 235/380
(58) Field of Classification Search .............. 235/375, 235/385, 380, 462.01
See application file for complete search history.

(56) References Cited

U.S. PATENT DOCUMENTS

| | | | |
|---|---|---|---|
| 6,739,512 B2 | 5/2004 | Guerrero et al. | |
| 6,816,751 B1 | 11/2004 | Alice et al. | |
| 7,055,737 B1* | 6/2006 | Tobin et al. | 235/375 |
| 7,099,728 B2* | 8/2006 | Urabe | 700/109 |
| 7,207,486 B1* | 4/2007 | Bennett | 235/385 |
| 7,937,176 B2* | 5/2011 | Knipfer et al. | 700/99 |
| 2004/0256463 A1* | 12/2004 | Kudo | 235/462.11 |
| 2005/0061878 A1* | 3/2005 | Barenburg et al. | 235/385 |

* cited by examiner

*Primary Examiner* — Daniel St Cyr
(74) *Attorney, Agent, or Firm* — Ishimaru & Associates LLP; Mikio Ishimaru

(57) ABSTRACT

A product identification system includes a product system having a component, identifying a characteristic of the component, and forming an identifier including the characteristic of the component.

20 Claims, 3 Drawing Sheets

PRODUCT IDENTIFICATION SYSTEM WITH COMPONENT CHARACTERISTICS

TECHNICAL FIELD

The present invention relates generally to product systems, and more particularly to a system for product identification.

BACKGROUND ART

The demands for high performance electronic products with higher performing semiconductor devices have increased concerns over reliability of semiconductor devices or components. Modern electronics including consumer and commercial products such as cellular phones, game consoles, computer systems, and video displays, require increasing integrated circuit die content with ever-increasing performance. Returns are one of the most undesirable and costly issues for product vendors especially vendors of high performance technology products. If products turn out to be recalled, these vendors can suffer significant financial damage.

In the semiconductor world, reliability can mean the ability not to be disqualified within the duration of use. If the chip has poor reliability, it will deteriorate its power, speed, or even stop working within the duration of use. In general, integrated circuits distributed on the side of higher power and/or slower speed have a higher possibility of being unreliable or defective after coming onto the market or product introduction. Especially those integrated circuits with characteristics near or on the edge of the distribution have the highest risk of becoming unreliable within the duration of use.

Electronic products may include many components or devices from a potentially wide variety of suppliers. These components can vary in performance including power and speed even from a single supplier. Manufacturing variations can be a primary contributor to these variations causing a significant distribution or variance in performance for a given component. These components can vary significantly across a large production quantity of a single electronic product. In the event of a reliability issue, a vendor might be required to recall affected products. The affected products may actually be related to only specific components with identifiable characteristics.

Products are typically identified by the vendor providing the consumer or commercial system based on the vendor's manufacturing criteria. The individual components within the product are generally assumed to be within specification and thereby associated with the system vendor's product identification. Unfortunately, the individual components can vary based on the component vendor's manufacturing processes and criteria. In the event that defective product is caused at least in part by the component vendor's characteristics, the system vendor can only identify large sequences or all of the product having the component vendor's parts. Large quantities of potentially affected product are extremely costly and damaging to a vendor's reputation.

While it is most desirable to provide non-defective products, it is inevitable that some products will not meet specifications. Products increasingly include internal components having distributions or variances from a supplier. The distribution or variance of the internal component is particularly difficult to identify when assembled in the consumer or commercial product. It is therefore important to consider minimizing product liability risks such as integrated circuit deterioration, increasing power consumption, degradation in speed, or failure within the duration of use with internal components having individual characteristics.

Thus, a need still remains for a product identification system to improve product identification including component characteristics. In view of the ever-increasing commercial competitive pressures, along with growing consumer expectations and the diminishing opportunities for meaningful product differentiation in the marketplace, it is critical that answers be found for these problems. Additionally, the need to save costs, improve efficiencies and performance, and meet competitive pressures, adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a product system having a component, identifying a characteristic of the component, and forming an identifier including the characteristic of the component.

Certain embodiments of the invention have other aspects in addition to or in place of those mentioned above. The aspects will become apparent to those skilled in the art from a reading of the following detailed description when taken with reference to the accompanying drawings.

BEST MODE FOR CARRYING OUT THE INVENTION

Figure 1:
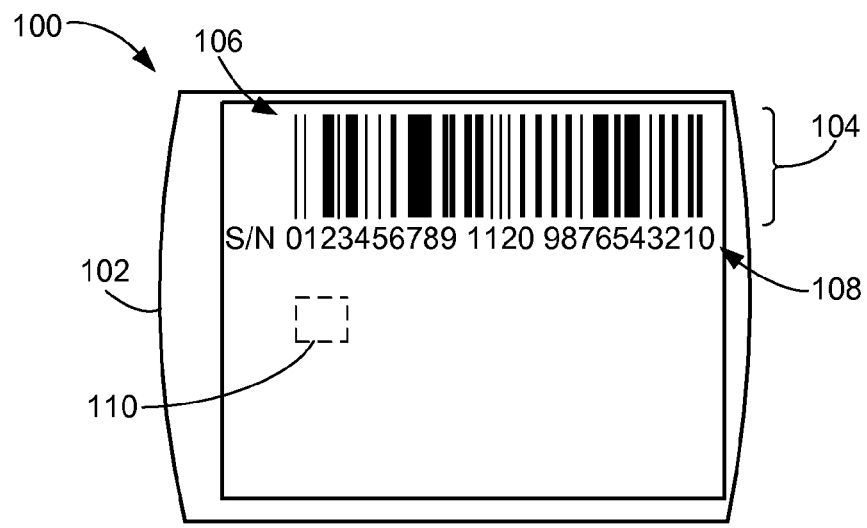
FIG. 1 is a bottom plan view of a product identification system in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

Likewise, the drawings showing embodiments of the system are semi-diagrammatic and not to scale and, particularly, some of the dimensions are for the clarity of presentation and are shown greatly exaggerated in the drawing FIGs. Where multiple embodiments are disclosed and described, having some features in common, for clarity and ease of illustration, description, and comprehension thereof, similar and like features one to another will ordinarily be described with like reference numerals.

For expository purposes, the term "horizontal" as used herein is defined as a plane parallel to the plane or surface of the invention, regardless of its orientation. The term "vertical" refers to a direction perpendicular to the horizontal as just defined. Terms, such as "on", "above", "below", "bottom", "top", "side" (as in "sidewall"), "higher", "lower", "upper", "over", and "under", are defined with respect to the horizontal plane.

The term "on" as used herein means and refers to direct contact among elements. The term "processing" as used herein includes deposition of material, patterning, exposure, development, etching, cleaning, and/or removal of the material or trimming as required in forming a described structure. The term "system" as used herein means and refers to the method and to the apparatus of the present invention in accordance with the context in which the term is used.

Referring now to FIG. 1, therein is shown a bottom plan view of a product identification system 100 in an embodiment of the present invention. The product identification system 100 includes a product system 102 having an identifier 104. The identifier 104 can include a scan code 106 such as a bar code or a character code 108 such as a serial number. The product system 102 can include a component 110 such as an integrated circuit device.

The component 110 preferably includes characteristics such as clock rate, power consumption, or other manufacturing specification. Actual values versus specification values of these characteristics can be expressed as distributions such as standard deviations from the mean or sigma. For illustrative purposes, the identifier 104 is shown with the scan code 106 as a bar code and the character code 108 as a serial number although it is understood that other identification methods may be used.

It has been discovered that the product identification system 100 provides identification of unreliable components in the product system 102 resulting in reducing costs of recalls.

Figure 2:
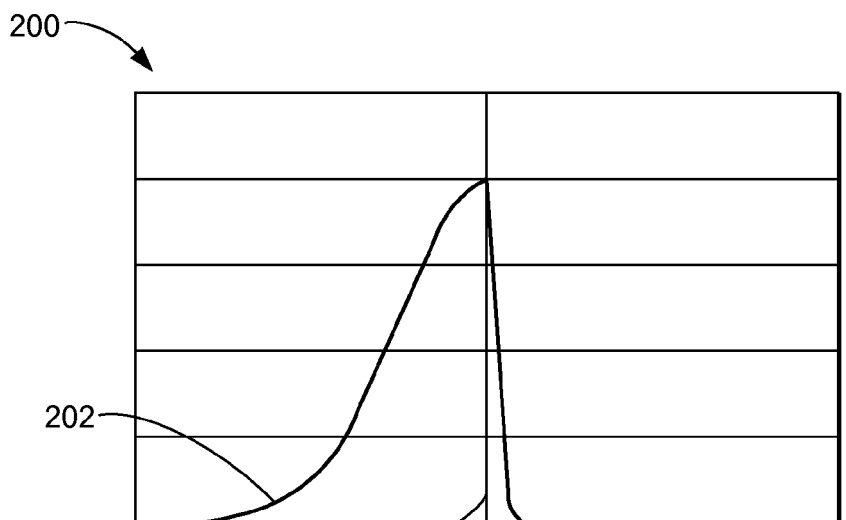
FIG. 2 is a component distribution graph.

Referring now to FIG. 2 therein is shown a component distribution graph 200. The product identification system 100 of FIG. 1 can include one or more of the component 110 of FIG. 1 having component values 202 of the characteristics, such as power, with an asymmetric distribution.

Processes such as testing and sorting can provide the product system 102 of FIG. 1 with the component 110 having the characteristic distributed based on desired values or ranges. Selection based on the desired values or ranges can provide distributed characteristics in a narrower range than a normal distribution. The narrow range can also be truncated or skewed with respect to a mean 204 resulting in the asymmetric distribution.

Figure 3:
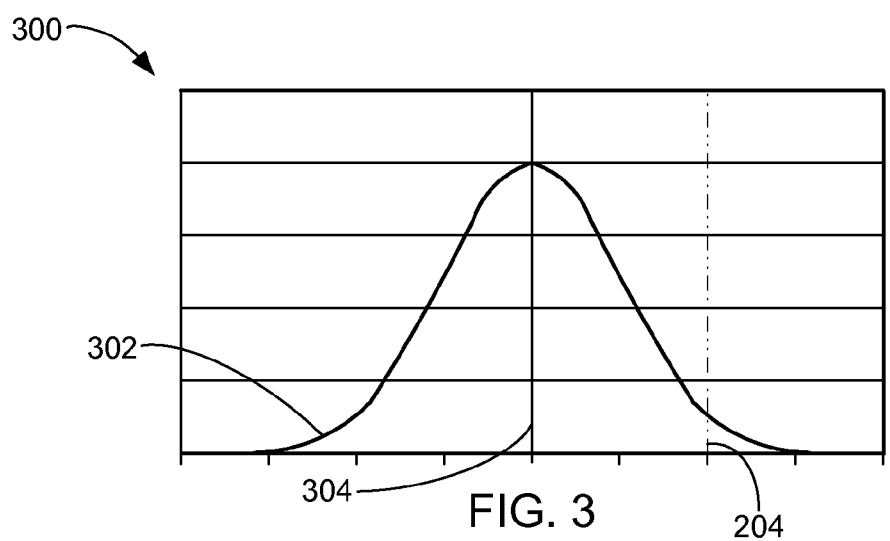
FIG. 3 is a transformed component distribution graph.

Referring now to FIG. 3, therein is shown a transformed component distribution graph 300. The characteristics of a set such as a wafer lot or bin of more than one of the component 110 of FIG. 1 can be normalized such as with a Fisher Transform providing a normal or Gaussian distribution. The Gaussian distribution of transformed component values 302, such as power, provides a transformed mean 304. The transformed mean 304 can be offset from the mean 204 based on desired values or ranges of the characteristics of the set of more than one of the component 110.

The transformed component values 302 are distributed with approximately thirteen one-hundredths of a percent, 0.13%, of the set of more than one of the component 110 above three standard deviations (3 sigma), and approximately two and twenty-eight hundredths of a percent, 2.28%, above two standard deviations (2 sigma).

Figure 4:
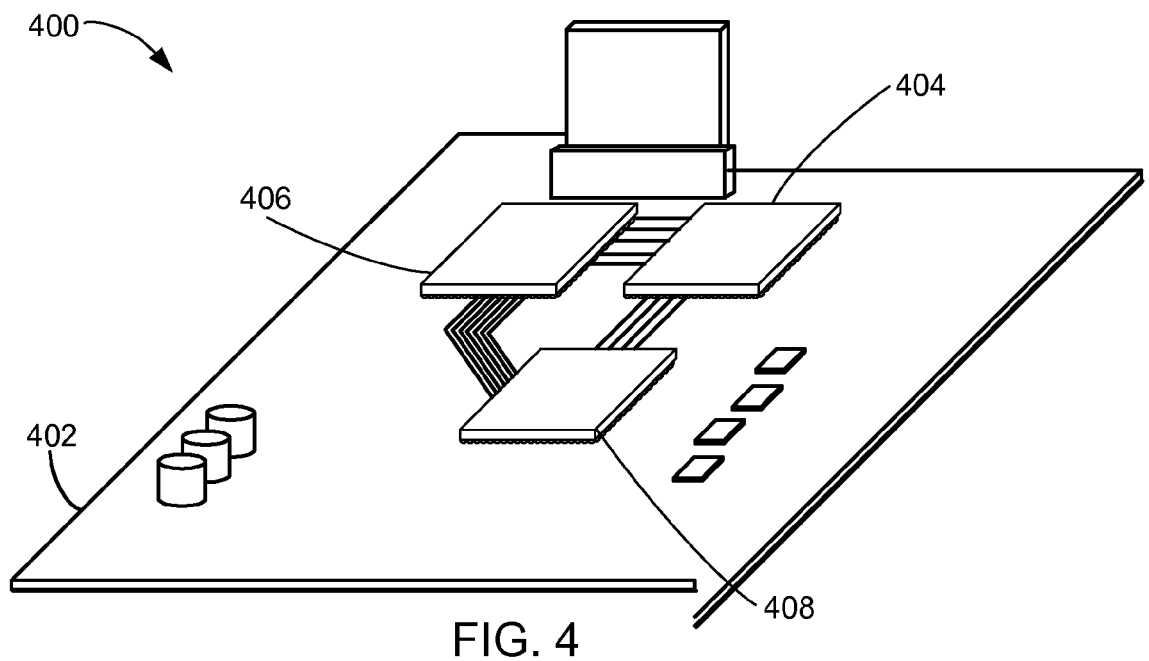
FIG. 4 is an isometric view of a product identification system in a component assembly phase in an alternative embodiment of the present invention.

Referring now to FIG. 4, therein is shown an isometric view of a product identification system 400 in a component assembly phase in an alternative embodiment of the present invention. The product identification system 400 preferably includes a substrate 402 such as a motherboard. The substrate 402 can include a first component 404 such as a first processor, a second component 406 such as a second processor, and a third component 408, such as an application specific integrated circuit device (ASIC).

For example, the first component 404 can have a clock rate within one standard deviation and power consumption within three standard deviations. Further, for example, the second component 406 can have a clock rate within two standard deviations and power consumption within two standard deviations. Yet further, for example, the third component 408 can have a clock rate and power consumption both within one standard deviation.

Figure 5:
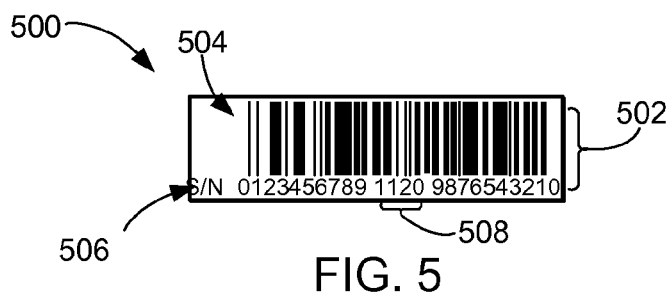
FIG. 5 is an identifier of the product identification system.

Referring now to FIG. 5, therein is shown an identifier 502 of the product identification system 400. The identifier 502 can include a scan code 504 such as a bar code and a character code 506 such as a serial number. The scan code 504 can preferably provide features compatible with a scanning process. Substantially the same identification can preferably be provided visually by the character code 506.

For example, a characteristic code 508 includes four digits "1", "1", "2", and "0" that can be decimal equivalent values for binary "bit data" representing the distribution of actual values versus specification values of characteristics of the first component 404 of FIG. 4 and the second component 406 of FIG. 4.

In this example, the first digit, "1" (binary "01"), indicates power consumption within one standard deviation of the first component 404, the second digit, "1" (binary "01"), indicates clock rate within two standard deviations for the first component 404, the third digit, "2" (binary "10"), indicates power consumption of the second component 406 within three standard deviations, and the fourth digit, "0" (binary "00") indicates clock rate of the second component 406 within one standard deviation.

Figure 6:
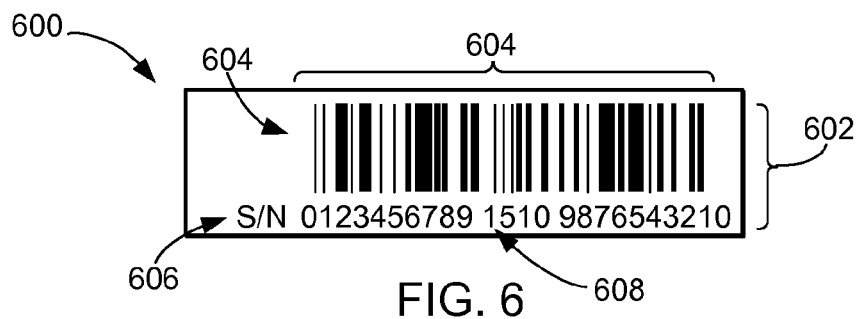
FIG. 6 is a product identification system in another alternative embodiment of the present invention.

Referring now to FIG. 6, therein is shown a product identification system 600 in another alternative embodiment of the present invention. The product identification system 600 includes an identifier 602 having a scan code 604 such as a bar code and a character code 606 such as a serial number. The scan code 604 can preferably provide features compatible with a scanning process.

Substantially the same identification can preferably be provided visually by the character code 606. The product identification system 600 provides identification of product having a component such as a processor having a power consumption distribution represented by an eleventh numeral location from the left in a characteristic code 608. For example, components having three standard deviations or larger can be identified by the numeral "1", "3", "5", or "7".

Figure 7:
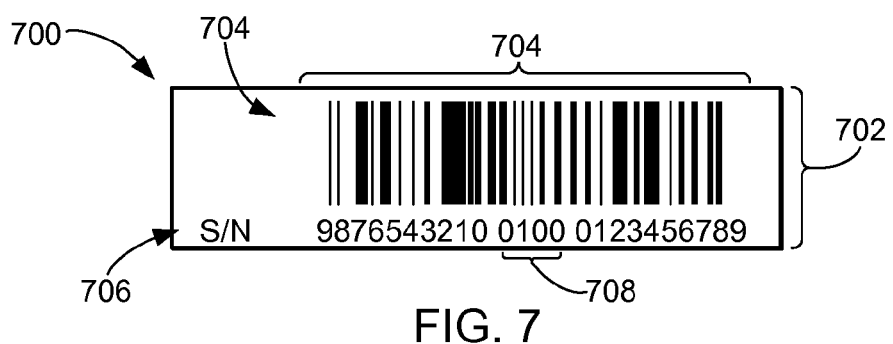
FIG. 7 is a product identification system in another alternative embodiment of the present invention.

Referring now to FIG. 7, therein is shown a product identification system 700 in another alternative embodiment of the present invention. The product identification system 700 includes an identifier 702 having a scan code 704 such as a bar code and a character code 706 such as a serial number. The scan code 704 can preferably provide features compatible with a scanning process.

Substantially the same identification can preferably be provided visually by the character code 706. The product identification system 700 provides identification of product having a component such as a processor having a clock rate distribution represented by four numerals starting with the eleventh numeral location from the left in a characteristic code 708. For example, components having two standard deviations or larger can be identified by the decimal number "100" or higher.

Figure 8:
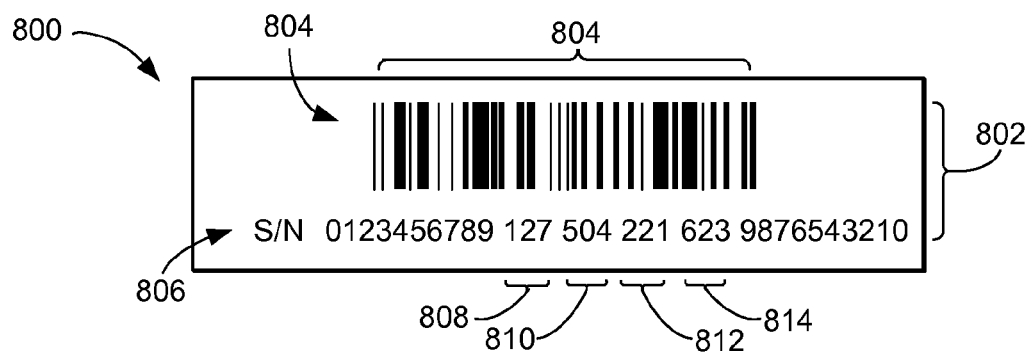
FIG. 8 is a product identification system in another alternative embodiment of the present invention.
Figures 9A, 9B, 9C, 9D:
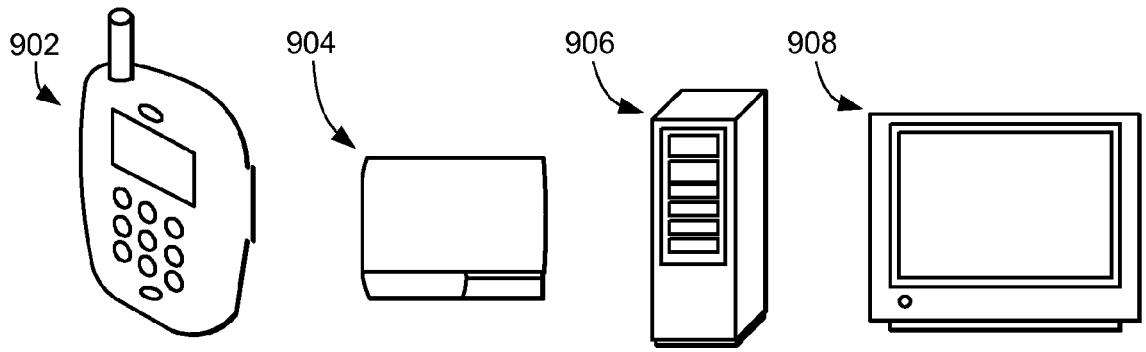
FIGS. 9A, 9B, 9C and 9D, are schematic views of electronics systems as examples in which various embodiments of the present invention can be implemented.

Referring now to FIG. 8, therein is shown a product identification system 800 in another alternative embodiment of the present invention. The product identification system 800 includes an identifier 802 having a scan code 804 such as a bar code and a character code 806 such as a serial number. The scan code 804 can preferably provide features compatible with a scanning process.

Substantially the same identification can preferably be provided visually by the character code 806. The product identification system 800 provides identification of product having a first component such as a first processor and a second component such as a second processor. Characteristics of the first component and the second component can be recorded in the character code 806.

For example, the character code 806 can preferably include a first characteristic code 808 having a clock rate for the first processor with the digits "127" starting with the eleventh numeral location from the left to represent one and twenty-seven hundredths gigahertz (1.27 GHz). Further for example, the character code 806 can preferably include a second characteristic code 810 having a power consumption for the first processor with the digits "504" starting with the fourteenth numeral location from the left to represent fifty and four tenths watts (50.4 W).

Yet further for example, the character code 806 can preferably include a third characteristic code 812 having a clock rate for the second processor with the digits "221" starting with the seventeenth numeral location from the left to represent two and twenty-one hundredths gigahertz (2.21 GHz). Yet further for example, the character code 806 can preferably include a fourth characteristic code 814 having a power consumption for the second processor with the digits "623" starting with the twentieth numeral location from the left to represent sixty-two and three tenths watts (62.3 W).

Referring now to FIGS. 9A, 9B, 9C and 9D, therein are shown schematic views of electronics systems as examples in which various embodiments of the present invention can be implemented. A smart phone 902, a game console 904, a computer system 906, and a video display 908 are examples of the electronic systems having embodiments of the present invention. The electronic systems can be any system that performs any function including information creation, transportation, transmittal, modification, storage, or any combination thereof.

For example, the smart phone 902 can create or transmit information to the computer system 906 or the game console 904. The video display 908 can create or modify visual graphics from the smart phone 902, the game console 904, or the computer system 906. The smart phone 902, the game console 904, and the computer system 906 can store information for use with any other electronics system. Other electronic systems can transmit or transport information to the smart phone 902, the game console 904, the computer system 906, and the video display 908.

Figure 10:
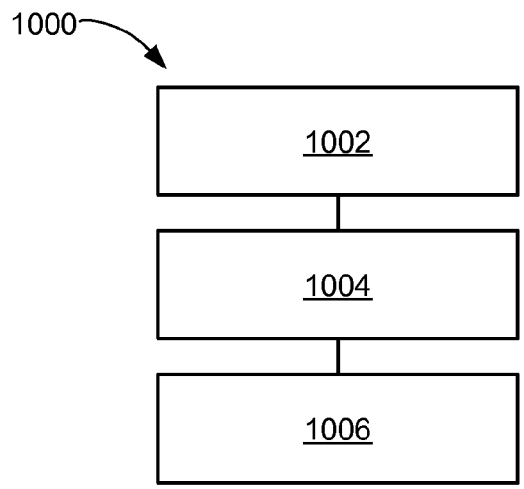
FIG. 10 is a flow chart of a product identification system for manufacturing the product identification system in an embodiment of the present invention.

Referring now to FIG. 10, therein is shown a flow chart of a product identification system 1000 for manufacturing the product identification system 100 in an embodiment of the present invention. The system 1000 includes providing a product system having a component in a block 1002; identifying a characteristic of the component in a block 1004; and forming an identifier including the characteristic of the component in a block 1006.

In greater detail, a system to provide the method and apparatus of the product identification system 100, in an embodiment of the present invention, is performed as follows:
1. Manufacturing a product system with a component having a specification.
2. Identifying a characteristic of the specification for the component.
3. Forming an identifier including the characteristic of the specification for the component.

Thus, it has been discovered that the product identification system including both method and apparatus of the present invention furnish important and heretofore unknown and unavailable solutions, capabilities, and functional aspects. The resulting processes and configurations are straightforward, cost-effective, uncomplicated, highly versatile, accurate, sensitive, and effective, and can be implemented by adapting known components for ready, efficient, and economical manufacturing, application, and utilization.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations, which fall within the scope of the included claims. All matters hithertofore set forth herein or shown in the accompanying drawings are to be interpreted in an illustrative and non-limiting sense.

What is claimed is:

1. A method for operating a product identification system comprising:
   providing a product system having a component;
   identifying a specification value of a distributed characteristic of the component; and
   forming an identifier including the specification value of the distributed characteristic of the component.

2. The method as claimed in claim 1 wherein forming the identifier includes forming a scan code including the distributed characteristic of the component.

3. The method as claimed in claim 1 wherein forming the identifier includes forming a character code including the distributed characteristic of the component.

4. The method as claimed in claim 1 wherein forming the identifier includes identifying a manufacturing characteristic of the component.

5. The method as claimed in claim 1 wherein forming the identifier includes forming the identifier including a characteristic of a second component.

6. A method for operating a product identification system comprising:
   manufacturing a product system with a component having a specification;
   identifying a distributed characteristic of the specification for the component; and
   forming an identifier including the distributed characteristic of the specification for the component.

7. The method as claimed in claim 6 wherein forming the identifier includes forming a bar code including the distributed characteristic of the specification for the component.

8. The method as claimed in claim 6 wherein forming the identifier includes forming a serial number including the distributed characteristic of the specification for the component.

9. The method as claimed in claim 6 wherein forming the identifier includes forming a characteristic code with a manufacturing characteristic distribution of the component.

10. The method as claimed in claim 6 wherein forming the identifier includes forming a characteristic code for a second component.

11. A product identification system comprising:
a product system having a component; and
an identifier for identifying a specification value of a distributed characteristic of the component.

12. The system as claimed in claim 11 wherein the identifier includes a scan code including the distributed characteristic of the component.

13. The system as claimed in claim 11 wherein the identifier includes a character code including the distributed characteristic of the component.

14. The system as claimed in claim 11 wherein the identifier includes a manufacturing characteristic of the component.

15. The system as claimed in claim 11 wherein the identifier includes a characteristic of a second component.

16. The system as claimed in claim 11 wherein:
the product system is the product system with the component having a specification; and
the identifier is the identifier for identifying the distributed characteristic of the specification for the component.

17. The system as claimed in claim 16 wherein the identifier includes a bar code including the distributed characteristic of the specification for the component.

18. The system as claimed in claim 16 wherein the identifier includes a serial number including the distributed characteristic of the specification for the component.

19. The system as claimed in claim 16 wherein the identifier includes a characteristic code with a manufacturing characteristic distribution of the component.

20. The system as claimed in claim 16 wherein the identifier includes a characteristic code for a second component.

* * * * *